United States Patent [19]

Borromeo

[11] Patent Number: 4,969,374
[45] Date of Patent: Nov. 13, 1990

[54] STEM FOR BICYCLE HANDLEBARS
[75] Inventor: Lucio Borromeo, Turin, Italy
[73] Assignee: 3T S.p.A., Turin, Italy
[21] Appl. No.: 364,039
[22] Filed: Jun. 9, 1989

[30] Foreign Application Priority Data

Oct. 10, 1988 [IT] Italy .............................. 53456/88[U]

[51] Int. Cl.$^5$ .......................................... B62K 21/12
[52] U.S. Cl. .................... 74/551.1; 280/279; 403/191; 403/344
[58] Field of Search ............... 74/551.1, 551.3, 551.7, 74/551.8; 280/279, 280, 288.4; 403/191, 209, 344

[56] References Cited

U.S. PATENT DOCUMENTS

| 4,435,983 | 3/1984 | Shimano | 280/279 X |
| 4,493,225 | 1/1985 | Galahad | 74/551.3 |
| 4,794,815 | 1/1989 | Borromeo | 74/551.1 |

FOREIGN PATENT DOCUMENTS

| 2717316 | 10/1978 | Fed. Rep. of Germany | 74/551.1 |
| 3340893 | 5/1984 | Fed. Rep. of Germany | 74/551.8 |
| 2453771 | 11/1980 | France | 74/551.1 |
| 2513960 | 4/1983 | France | 280/279 |
| 2531026 | 2/1984 | France | 74/551.1 |
| 2596014 | 9/1987 | France | 280/279 |
| 113590 | 3/1945 | Sweden | 74/551.3 |
| 253155 | 2/1948 | Switzerland | 74/551.1 |
| 2139163 | 11/1984 | United Kingdom | 280/279 |

Primary Examiner—Vinh T. Luong
Attorney, Agent, or Firm—Sughrue, Mion, Zinn, Macpeak & Seas

[57] ABSTRACT

A bicycle handlebar attachment includes a stem adapted at one end for connection to the head tube and having an eyelet at its opposite end for receiving the handlebar crossbar. The eyelet is divided by a slit into two jaws, one of which defines a threaded blind hole and the other of which has a partially-threaded through-hole aligned with the blind hole for receiving a screw for clamping the jaws together to tighten the eyelet on the crossbar. When the screw is released from the blind hole, an abutment plate can be inserted in the slot and the screw tightened aginast it to force the jaws apart to allow the crossbar to be inserted in or removed from the eyelet.

2 Claims, 1 Drawing Sheet

STEM FOR BICYCLE HANDLEBARS

BACKGROUND OF THE INVENTION

The present invention relates to an attachment stem for bicycle handlebars of the type comprising a shank, which can be coupled to the head tube of the front fork of the bicycle, and an arm which extends from the top of the shank and has a free end formed into an eyelet, the eyelet having a slit which divides it into a main jaw, which forms part of the arm proper, and an auxiliary sprung jaw, and in which a threaded blind hole is formed in the main jaw whilst a through-hole is formed in the auxiliary jaw in alignment with the blind hole for engagement by a screw for clamping the central part of the crossbar of the handlebars which is inserted in the eyelet.

Stems of this type are used particularly for racing handlebars. Their purpose is to provide the region of the joint between the stem and the crossbar of the handlebars with a shape which is both aerodynamic and aesthetic. In most conventional stems, it is necessary for the eyelet to be enlarged with a suitable tool which is inserted in the slit so as to lever the two jaws apart and allow the crossbar to slide in the eyelet for its assembly and removal. In the absence of a levering tool, a screwdriver or other bladed tool may be used for the same purpose. The Applicant's Italian utility model No. 194553 describes a stem of the type indicated which can be enlarged by means incorporated in the stem itself. More specifically, a threaded hole is formed in the auxiliary jaw of the stem substantially parallel to and alongside the through-hole (which has smooth walls and is of larger diameter than the screw) and an externally-operable pressure screw is engaged therein for reacting against the main jaw in order to enlarge the eyelet by forcing the jaws apart when the clamping screw is slackened.

SUMMARY OF THE INVENTION

The object of the present invention is to provide a new stem of the type mentioned above which enables the eyelet to be enlarged by means incorporated in the stem and which, at the same time, is simpler and less expensive than the solution which is the subject of the utility model identified above.

In order to achieve this object, the invention provides an attachment stem for bicycle-handlebars of the type indicated at the beginning, characterised in that the through-hole has at least one portion which is threaded so as to enable the two jaws to be forced apart when the clamping screw is removed by the insertion of an abutment plate into the slit in the stem and the subsequent screwing of a threaded member into the threaded portion of the through-hole.

The pressure thus exerted by the threaded member against the abutment surface causes the auxiliary jaw to move away from the surface and, consequently, the eyelet of the coupling to be enlarged. Once the crossbar of the handlebars has been inserted in the eyelet, the stem can be clamped, by first the slackening of the threaded member so as to enable the abutment surface to be removed from the slit and then the screwing of the clamping screw into the threaded blind hole of the main jaw so as to clamp the two jaws together.

The threaded portion of the through-hole preferably has a diameter and a thread which correspond with those of the blind hole so as to enable the clamping screw itself to be used for forcing apart the two jaws. In this case, the clamping screw has a smaller-diameter unthreaded portion near its head which is located within the threaded portion of the through-hole when the screw is screwed into the blind hole in the main jaw. The abutment plate may be constituted by any flat element which is sufficiently strong (even a coin, for example).

BRIEF DESCRIPTION OF THE DRAWINGS

The invention will now be described with reference to the appended drawings, provided purely by way of non-limiting example, in which.

DETAILED DESCRIPTION OF THE INVENTION

Figure 1:
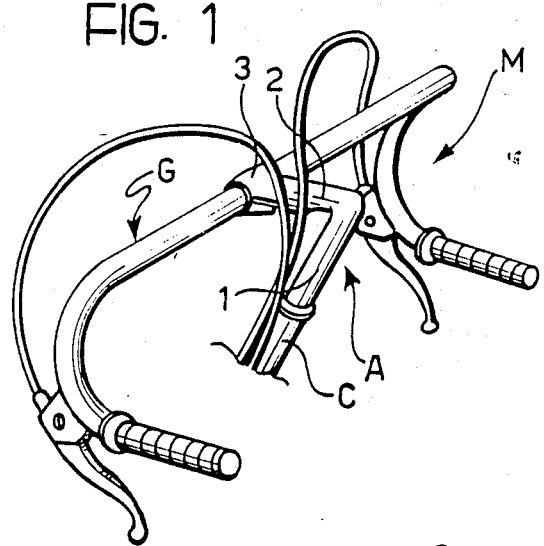
FIG. 1 is a perspective view of a bicycle handlebar including a stem according to the invention.

In FIG. 1, the handlebars M of a racing bicycle are indicated 1 and comprise a crossbar G or so-called "handlebar curve" and a stem A for connecting the crossbar G to the head tube C of the front fork of the bicycle.

The stem A includes a shank 1 which is inserted in the tube C. An arm 2 extends forwards, with respect to the direction of travel of the bicycle, from the upper end of the shank 1 and has a free end formed with an eyelet 3 which acts as a clamp for clamping the central part of the crossbar G of FIG. 1.

Figure 2:
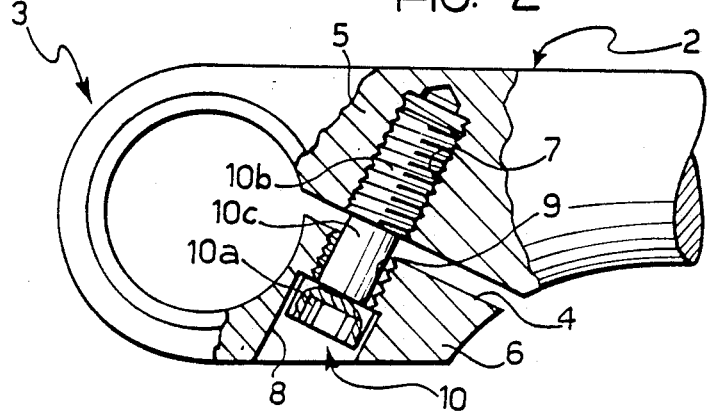
FIG. 2 is a side elevational view, partly broken away, of the eyelet end of the arm of the stem, in which a clamping screw is shown in the tightened condition.

With reference to FIG. 2, in order to form a clamp, the eyelet end 3 has a slit 4 in its lower part which divides it into an upper jaw 5, which forms part of the arm 2, and a lower sprung jaw 6. A threaded blind hole 7 is formed in the upper jaw 5. A through hole 8 is formed in the lower jaw 6 and is aligned with the blind hole 7. Unlike that described in Italian utility model No. 124553 by the same applicant, the through-hole 8 has a portion 9 of the same diameter as the blind hole 7 and with threading which is also identical to that of the blind hole 7.

A clamping screw 10 is screwed into the threaded blind hole 7 and clamps the crossbar G of the handlebars M in the eyelet 3 of the attachment stem. The screw 10 has a head with a recess 10a for the insertion of an operating key, a threaded end 10b and a smaller-diameter part 10c which is adjacent the head 10a and has no threading. When the screw 10 is screwed into the blind hole 7 (FIG. 2), the smaller-diameter portion 10c is located within the threaded hole 9 so that, in that condition, the threading of the hole is not engaged by the screw.

Figure 3:
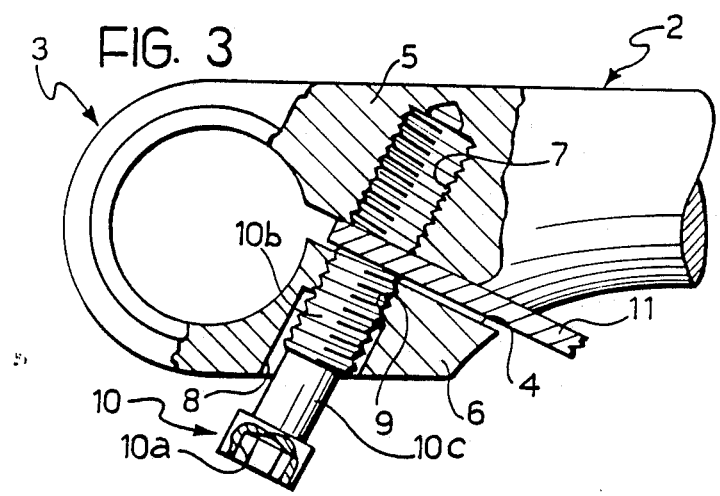
FIG. 3 is a view corresponding to FIG. 2 which shows the enlargement of the stem eyelet.

If it is desired to enlarge the eyelet of the attachment stem, an abutment plate which, in practice, may consist of any object or tool (even simply a coin), must first be inserted in the slit 4 with the screw removed. Once the plate 11 has been inserted in the slit 4, the end portion of the screw 10 is screwed into the threaded portion 9 of the through-hole 8. The tip of the screw is thus pressed against the abutment plate 11 and forces the lower jaw 6 to move away from the upper jaw 5, causing the enlargement of the eyelet of the stem (FIG. 3). Once the crossbar G of the handlebar M has been inserted in the enlarged eyelet, the screw 10 is slackened to enable the abutment plate 11 to be removed and the screw is then screwed up again until the portion 10b is engaged in the threaded blind hole 7 so as to clamp the handlebars tightly in the eyelet 3.

The stem according to the invention enables the eyelet to be enlarged easily without the need for an auxiliary pressure screw as in the case of Italian utility model No. 194553 and is thus simpler and cheaper. At the same time the enlargement operation is quick and easy.

Naturally, the scope of the present invention extends to models which achieve equal utility by means of the same innovative concept. For example, the hole 9 could have a different diameter from the hole 7 in which case the enlargement would be achieved by an auxiliary grub screw.

What is claimed is:

1. Attachment means for a bicycle handlebars comprising:
   a stem having a shank adapted to be coupled to a head tube of a front fork of a bicycle and an arm which extends from the top of the shank and has free end formed into an eyelet, said eyelet defining a slit which divides it into a main jaw, forming part of the arm proper and defining a threaded blind hole, and an auxiliary sprung jaw defining a through-hole aligned with said blind hole; and a screw engageable with said threaded blind hole to clamp a central part of the handlebars when inserted in said eyelet;
   wherein said auxiliary jaw defines at least one threaded portion of said through-hole and said screw has an unthreaded portion disposed in said threaded portion of said through-hole when said screw is in engagement with said threaded blind bore for clamping said central part of said handlebars, and
   wherein said slit has a width adapted to receive an abutment plate, such as a coin, between said jaws when said screw is disengaged from said blind bore for engagement by a threaded member in threaded engagement with said threaded portion of said through-hole to force said jaws apart thereby increasing the width of said slit.

2. Attachment means according to claim 3, wherein said threaded portion of said through-hole has a diameter and a threading which correspond to those of said blind hole so as to enable said clamping screw to be used as said threaded member for forcing said jaws apart.

* * * * *